Patented Jan. 29, 1924.

1,481,811

UNITED STATES PATENT OFFICE.

FRED W. SHIELDS, OF KANSAS CITY, MISSOURI, ASSIGNOR TO LITTLE WONDER LABORATORY, OF ATCHISON, KANSAS, A FIRM CONSISTING OF FRED W. SHIELDS, ALMA L. SHIELDS, AND GUY V. HALEY, ALL OF KANSAS CITY, MISSOURI.

SOAP PASTE.

No Drawing. Application filed August 29, 1921. Serial No. 496,607.

*To all whom it may concern:*

Be it known that I, FRED W. SHIELDS, a citizen of the United States, residing at Kansas City, in the county of Jackson and State of Missouri, have invented certain new and useful Improvements in Soap Pastes, of which the following is a specification.

The object of my invention is the production of a soap paste for removing dirt, grease, acid, ink, etc., from the hands and various kinds of articles such as garments, etc.

My composition consists of a mixture of tallow, borax, alum, soda, laundry soap, oil of wintergreen, sweet oil, liquid glass, boiling water, and pine saw dust.

In preparing the composition I prefer to use the ingredients in about the following proportions:—

| | |
|---|---|
| Tallow | 30 pounds. |
| Borax | 5 pounds. |
| Alum | 1 pound. |
| Soda | 5 pounds. |
| Laundry soap | 5 pounds. |
| Oil of wintergreen | 1 ounce. |
| Sweet oil | 1 ounce. |
| Liquid glass | 1 quart. |
| Boiling water | 5 gallons. |
| Pine sawdust | 35 pounds. |

Goods results may be obtained, however, when the ingredients are varied within the following limits:—

Tallow 25 to 35 pounds; borax 4 to 6 pounds; alum ¼ to 1¼ pounds; soda 4 to 6 pounds; laundry soap, 4 to 6 pounds; oil of wintergreen ¾ to 1¼ ounces; sweet oil ¼ to 1¼ ounces; liquid glass 1 pint to 1 quart; boiling water 4 to 6 gallons; and pine sawdust 30 to 40 pounds.

In preparing the composition, the tallow and the soap are melted, after which the borax, alum, soda, liquid glass, sweet oil and water are added. After the foregoing ingredients have been thoroughly mixed, the pine sawdust and the oil of wintergreen are added and also thoroughly mixed with the other ingredients, after which the composition is permitted to cool, when it is ready to put up into cans for the market.

The alum, sweet oil, and liquid glass may be omitted when a cheaper product is desired.

My composition is very efficient in cleaning various articles and especially those hereinbefore pointed out.

Having thus described my invention, what I claim and desire to secure by Letters Patent, is:

A plastic composition adapted to form a soap paste, consisting of thirty pounds of tallow, five pounds of borax, one pound of alum, five pounds of soda, five pounds of laundry soap, one ounce of oil of wintergreen, one ounce of sweet oil, one quart of liquid glass, five gallons of boiling water, and thirty-five pounds of pine sawdust.

In testimony whereof I affix my signature, in the presence of two witnesses.

FRED W. SHIELDS.

Witnesses:
CAROLYN COOK,
L. J. FISCHER.